(12) United States Patent
Chen

(10) Patent No.: US 9,664,119 B2
(45) Date of Patent: May 30, 2017

(54) GAS FLOW ADJUSTING DEVICE

(71) Applicant: Wen-Chuan Chen, Taoyuan (TW)

(72) Inventor: Wen-Chuan Chen, Taoyuan (TW)

( * ) Notice: Subject to any disclaimer, the term of this patent is extended or adjusted under 35 U.S.C. 154(b) by 45 days.

(21) Appl. No.: 14/821,324

(22) Filed: Aug. 7, 2015

(65) Prior Publication Data

US 2016/0201577 A1    Jul. 14, 2016

(30) Foreign Application Priority Data

Jan. 9, 2015   (TW) .............................. 104100850 A
Apr. 30, 2015   (TW) .............................. 104113831 A
Jun. 23, 2015   (TW) .............................. 104120142 A

(51) Int. Cl.
*F02D 9/10*    (2006.01)
*F16K 31/12*   (2006.01)
(Continued)

(52) U.S. Cl.
CPC ............... *F02D 9/10* (2013.01); *F02D 9/101* (2013.01); *F02D 9/1065* (2013.01); *F02D 9/1095* (2013.01); *F16K 15/038* (2013.01); *F16K 31/12* (2013.01); *F02D 2009/024* (2013.01); *F02D 2009/0269* (2013.01)

(58) Field of Classification Search
CPC ........... F02D 9/10; F02D 9/101; F02D 9/1065
USPC ...... 137/527, 513.5; 251/212, 279–280, 287, 251/286
See application file for complete search history.

(56) References Cited

U.S. PATENT DOCUMENTS 2,102,846 A    12/1937   Hunt
3,678,958 A    7/1972    Satterwhite et al.
(Continued)

FOREIGN PATENT DOCUMENTS

AU    605112 B2    4/1987
EP    3001077 A1   3/2016
(Continued)

OTHER PUBLICATIONS

The European Search Report of EP 15181107.2, dated Jun. 14, 2016.
(Continued)

*Primary Examiner* — Mary McManmon
*Assistant Examiner* — Nicole Gardner
(74) *Attorney, Agent, or Firm* — Christensen, Fonder, Dardi & Herbert PLLC

(57) ABSTRACT

A gas flow adjusting device is provided, which includes a tube body, a first horizontal shaft, a second horizontal shaft, two leaf structures, a torsional spring and two linkage assemblies. The first and second horizontal shafts are disposed in an accommodating space of the tube body and spaced apart from each other along an axial direction of the tube body. The leaf structures are pivoted on the first horizontal shaft and have a swinging direction identical to the axial direction. The torsional spring is sleeved around the second horizontal shaft and provides a resilient force along the axial direction. The linkage assemblies are connected to the leaf structures respectively, and each of the linkage assemblies is connected to the second horizontal shaft and the torsional spring. Therefore, when the leaf structures swing to different angles, the twisting amounts of the torsional spring are minimally varied.

13 Claims, 23 Drawing Sheets

(51) Int. Cl.
*F16K 15/03* (2006.01)
*F02D 9/02* (2006.01)

(56) References Cited

U.S. PATENT DOCUMENTS

| | | | | |
|---|---|---|---|---|
| 4,005,732 | A | * | 2/1977 | Buckner ............... F16K 15/038 137/512.1 |
| 4,079,751 | A | * | 3/1978 | Partridge ............. F16K 15/038 137/512.1 |
| 4,141,380 | A | * | 2/1979 | Lenk .................... G05D 7/0173 137/513.5 |
| 4,373,216 | A | * | 2/1983 | Klawitter .............. A61F 2/2403 137/512.1 |
| 4,457,333 | A | | 7/1984 | Sharp |
| 5,246,032 | A | * | 9/1993 | Muddiman ........... F16K 15/038 137/512.1 |
| 5,392,810 | A | * | 2/1995 | Cooper ................. F16K 15/038 137/512.1 |
| 6,237,625 | B1 | * | 5/2001 | Randolph ............. F16K 15/038 137/512.15 |
| 8,726,930 | B2 | * | 5/2014 | Barone ............... F16K 27/0227 137/512.1 |
| 2008/0236680 | A1 | | 10/2008 | Abram et al. |
| 2009/0056818 | A1 | * | 3/2009 | McGonigle ........... F16K 15/038 137/527 |
| 2013/0019966 | A1 | * | 1/2013 | Hawa ....................... F16K 1/22 137/527 |

FOREIGN PATENT DOCUMENTS

| | | |
|---|---|---|
| JP | 50-025654 | 8/1975 |
| JP | 55-049097 A | 9/1980 |
| JP | 60-125475 A | 7/1985 |
| JP | 63-021334 A | 1/1988 |
| JP | 63-183224 A | 7/1988 |
| JP | 09-505874 A | 6/1997 |

OTHER PUBLICATIONS

The Japanese Office Action of JP 2015-161921, dated Jun. 21, 2016 along with a concise English explanation.

* cited by examiner

GAS FLOW ADJUSTING DEVICE

CROSS-REFERENCES TO RELATED APPLICATIONS

This application claims priorities to Taiwan Patent Applications No. 104100850 filed on Jan. 9, 2015, No. 104113831 filed on Apr. 30, 2015 and No. 104120142 filed on Jun. 23, 2015, which are hereby incorporated herein by reference in their entirety.

BACKGROUND OF THE INVENTION

Field of the Invention

The present invention provides a gas flow adjusting device, and more particularly, to a gas flow adjusting device used at the upstream of a suction source of a gas inlet end of an internal combustion engine or a gas compressor.

Descriptions of the Related Art

Given the rising price of fuels (e.g., gasoline, or diesel), people are paying more and more attention to the oil consumption of vehicles and expect vehicles to travel a longer distance with per liter of fuel. To satisfy this expectation, various products have been developed by manufacturers to reduce the oil consumption of vehicles in various respects (e.g., tires, the outline of the vehicle body, air filters, engine oil, or electronic elements).

For example, some manufactures have proposed a conventional variable flow controlling device which can be disposed between the gas inlet and the gas throttle of a vehicle. The variable flow controlling device can make the change in the vacuum degree between the gas throttle and the gas inlet manifold obvious so that the engine can operate smoothly to save energy. However, in practical implementations, it has been found that although the negative pressure is indeed increased, the relative positive pressure is decreased after the installation of the variable flow controlling device, which means that the gas inflow amount within the cylinder is reduced rather than increased.

Accordingly, a need exists in the art to provide a device to solve at least one of the aforesaid drawbacks.

SUMMARY OF THE INVENTION

An objective of the present invention is to provide a gas flow adjusting device, which can at least assist in improving the gas inflow efficiency of the cylinder (the suction source, the negative pressure source).

Another objective of the present invention is to provide a gas flow adjusting device, which can at least achieve bidirectional flow of the fluid so that when depressurization is necessary for the cylinder (the suction source, the negative pressure source), the reverse passage communicates with the atmosphere and the depressurization process is not hindered.

Yet a further objective of the present invention is to provide a gas flow adjusting device, which can at least adjust the gas flow sucked into the gas inlet pipe and provide more secure and durable components.

To achieve one of the aforesaid objectives, a gas flow adjusting device disclosed in the present invention comprises a tube body, a first horizontal shaft, a second horizontal shaft, two leaf structures, a torsional spring and two linkage assemblies. The tube body includes two openings and an accommodating space between the two openings. The first horizontal shaft and the second horizontal shaft are disposed in the accommodating space of the tube body and spaced apart from each other along an axial direction of the tube body. The two leaf structures are pivoted on the first horizontal shaft with a swinging direction identical to the axial direction of the tube body. The torsional spring is sleeved around the second horizontal shaft and provides a resilient force along the axial direction of the tube body; and the two linkage assemblies are connected to the two leaf structures respectively. Each of the two linkage assemblies is further connected to the second horizontal shaft and the torsional spring.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
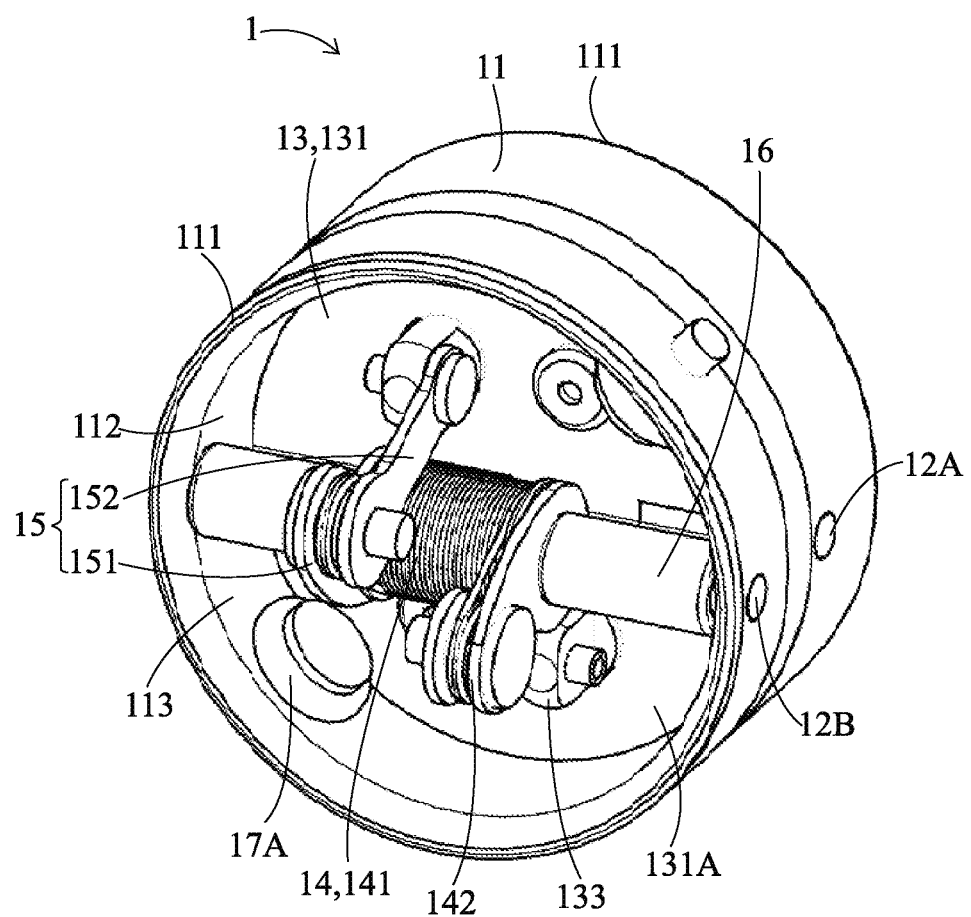
FIG. 1 is a perspective assembly view of a gas flow adjusting device according to the preferred embodiment of the present invention.
Figure 2:
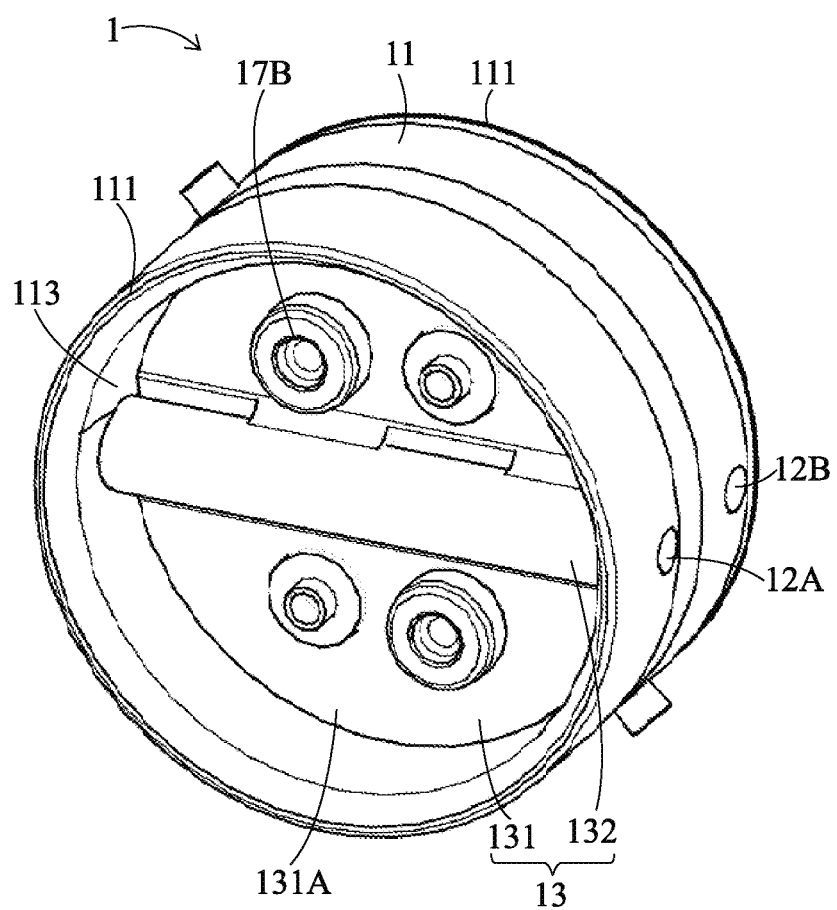
FIG. 2 is another perspective assembly view of the gas flow adjusting device according to the preferred embodiment of the present invention.

FIGS. 1 to 5 show two perspective assembly views, a perspective exploded view, a cross-sectional plan view and a top view of a gas flow adjusting device 1 according to the preferred embodiment of the present invention. The gas flow adjusting device 1 at least comprises a tube body 11, a first horizontal shaft 12A, a second horizontal shaft 12B, two leaf structures 13, a torsional spring 14 and two linkage assemblies 15. The technical contents of the aforesaid elements comprised in the gas flow adjusting device 1 will be described in sequence hereinafter.

The tube body 11 (which may also be called an annular body) may be a circular ring or a circular tube (or may be a tube or a ring with a polygonal section, e.g., a rectangular section or a triangular section), and may be made of a material with a preferred structural strength (e.g., metal). Structurally, the tube body 11 may have two openings 111, an accommodating space 112 and an interior surface 113. The accommodating space 112 and the interior surface 113 are located between the two openings 111. The interior surface 113 is a continuous curved surface and surrounds the accommodating space 112. The tube body 11 may have an imaginary axial direction 114. The interior surface 113 of the tube body 11 is formed by surrounding the axial direction 114. The tube body 11 is used to allow gas (not shown) to pass therethrough. That is, the gas can enter into the accommodating space 112 from one of the openings 111 and then exit from the tube body 11 through the other of the openings 111.

The first horizontal shaft 12A and the second horizontal shaft 12B are both disposed in the accommodating space 112 of the tube body 11 and spaced apart from each other along the axial direction 114 of the tube body 11 (with the distance therebetween corresponding to the size of the linkage assemblies 15 that will be described later). In other words, the axial directions (not shown) of the first horizontal shaft 12A and the second horizontal shaft 12B are perpendicular to and intersect with the axial direction 114 of the tube body 11, and both the first horizontal shaft 12A and the second horizontal shaft 12B pass through or make contact with the interior surface 113 of the tube body 11.

Moreover, when the first horizontal shaft 12A and the second horizontal shaft 12B are disposed in the accommodating space 112, two ends of each of the first horizontal shaft 12A and the second horizontal shaft 12B may be fixed relative to the interior surface 113 of the tube body 11 (i.e., closely fit with the interior surface 113 of the tube body 11). That is, the first horizontal shaft 12A and the second horizontal shaft 12B will not rotate by itself. In other words, the first horizontal shaft 12A and the second horizontal shaft 12B may be assembled into the tube body 11 through closely fitting with the tube body 11.

The two leaf structures 13 are both pivoted on the first horizontal shaft 12A, so the two leaf structures 13 can swing with the first horizontal shaft 12A as a pivot. The swinging direction of the two leaf structures 13 is identical to the axial direction 114 of the tube body 11. Thus, if the tube body 11 is placed vertically, then the leaf structures 13 can swing up and down; and if the tube body 11 is placed horizontally, then the leaf structures 13 can swing forwards and backwards.

The leaf structures 13 are defined to be in an initial status when the leaf structures 13 swing to a 0-degree position, and at this point, the leaf structures 13 can shield the cross section of the accommodating space 112 (i.e., the section intersecting with the axial direction 114) to the greatest extent. As shown by a gas passage 115 in FIG. 4, a clearance is still left for communication with the atmosphere and the device is not completely gastight. During the process in which the leaf structures 13 swing to a 90-degree position from the initial 0-degree position, the leaf structures 13 can passively adjust the cross section of the accommodating space 112 in response to demands for gas inflow amount to increase the gas flow required by various rotational speed ranges.

Structurally, each of the two leaf structures 13 may include a leaf portion 131 and an axle hole portion 132. The shape of the side surface 131A of the leaf portion 131 may correspond to the shape of the cross section of the accommodating space 112 (e.g., may be semicircular), so the side surfaces 131A of the two leaf portions 131 can together form a circle to resemble the shape of the cross section of the accommodating space 112. The axle hole portion 132 is disposed on the side surface 131A of the leaf portion 131 so that the first horizontal shaft 12A can pass therethrough to pivot the leaf structure 13 on the first horizontal shaft 12A.

When the two leaf structures 13 are defined to be in the initial status, the side surfaces 131A of the two leaf portions 131 intersect with the axial direction 114 of the tube body 11; and when the two leaf structures 13 swing to the 90-degree position, the side surfaces 131A of the two leaf portions 131 face each other.

Figure 4:
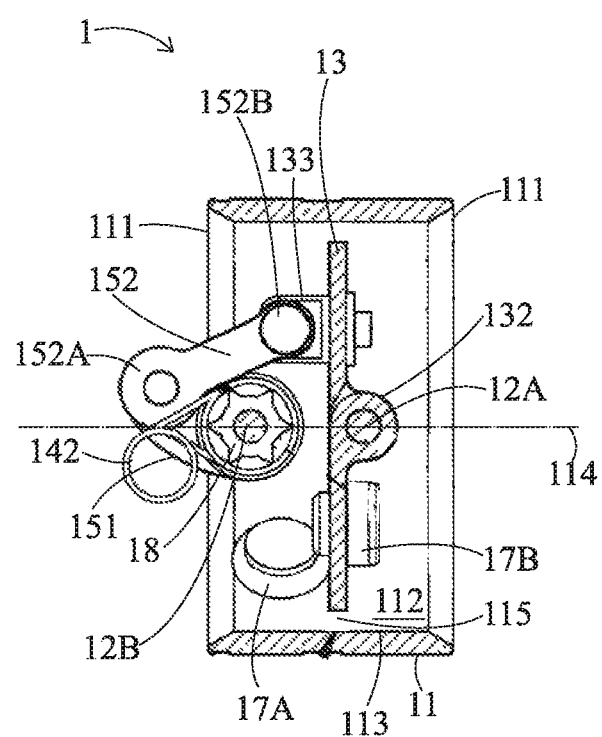
FIG. 4 is a cross-sectional plan view of the gas flow adjusting device according to the preferred embodiment of the present invention.

It shall be further appreciated that a clearance is purposely maintained between the interior surface 113 of the tube body 11 and each of the two leaf structures 13 to form the gas passage 115 (as shown in FIG. 4) to facilitate depressurization of the cylinder (it may be understood that the gas passage 115 is disposed along the periphery of the leaf structure 13, and thus, may be ring-shaped). Parts of the accommodating space 112 at both sides of the two leaf structures 13 can keep in communication by the gas passage 115. That is, when the leaf structure 13 swings to the 0-degree position, the gas can still flow through the distal end of the leaf structure 13 via the gas passage 115. Therefore, the gas can bi-directionally flow at two sides of the tube body 111, so the gas flow adjusting device 1 is not a one-way valve device for improving the vacuum degree.

The torsional spring 14 is sleeved around the second horizontal shaft 12B, so the torsional spring 14 is spaced apart from the first horizontal shaft 12A and the leaf structures 13 along the axial direction 114. The torsional spring 14 may provide a resilient force along the axial direction 114 of the tube body 11. That is, an external force may be exerted on the torsional spring 14 along the axial direction 114 so that the torsional spring 14 is twisted to accumulate a resilient force. After the external force is removed, the torsional spring 14 can release the resilient force along the axial direction 114.

Structurally, the torsional spring 14 may include a screw portion 141 and two cantilever portions 142. The screw portion 141 is sleeved around the second horizontal shaft 12B, while the two cantilever portions 142 extend from the screw portion 141. The ends of the two cantilever portions 142 may from a loop to be conveniently connected to the linkage assemblies 15 that will be described later.

The two linkage assemblies 15 are connected to the two leaf structures 13 respectively, and each of the two linkage assemblies 15 is further connected to the second horizontal shaft 12B and the torsional spring 14. In other words, each of the linkage assemblies 15 is connected to one of the leaf structures 13, the second horizontal shaft 12B and the torsional spring 14 so that the resilient force provided by the torsional spring 14 can work on the leaf structure 13 via the linkage assembly 15; the external force exerted on the leaf structure 13 can work on the torsional spring 14 via the linkage assembly 15.

Structurally, each of the two linkage assemblies 15 includes a first link 151 and a second link 152, the first link 151 has a first end 151A and a second end 151B opposite to the first end 151A, and the second link 152 has a first end 152A and a second end 152B opposite to the first end 152A. The first end 151A of the first link 151 is pivoted on the second horizontal shaft 12B, so the first link 151 can swing with the second horizontal shaft 12B as a revolving shaft. Moreover, the cantilever portions 142 of the torsional spring 14 may be fixed to the second end 151B of the first link 151 and the first end 152A of the second link 152, i.e., the cantilever portions 142 are connected to a joint where the first link 151 and the second link 152 are connected together. Thus, when the first link 151 swings, the cantilever portions 142 move accordingly so that the torsional spring 14 is twisted.

The second end 151B of the first link 151 is rotatably connected to the first end 152A of the second link 152 (e.g., via a rotary joint (not shown)), so the first link 151 and the second link 152 can form a rotatable joint (i.e., can rotate relative to each other).

The second end 152B of the second link 152 is rotatably connected to one of the two leaf structures 13, so the second link 152 can rotate relative to the leaf structure 13. The leaf structure 13 may have a rotary joint 133, while the rotary joint 133 is disposed on the side surface 131A of the leaf portion 131 and is rotatably connected to the second end 152B of the second link 152.

Thereby, the first link 151, the second link 152, the leaf structure 13 and the tube body 11 form a four-link mechanism. When the leaf structure 13 swings due to an external force, the second link 152 swings accordingly and the first link 151 moves accordingly. When the first link 151 and the second link 152 (linkage structures) swing or move, the torsional spring 14 is twisted to accumulate a resilient force. When the external force is removed from the leaf structure 13, the resilient force of the torsional spring 14 enables the first link 151 to swing reversely so that the leaf structure 13 swings reversely.

It shall be appreciated that due to the transferring effect of the linkage assemblies 15, the external force exerted on the leaf structure 13 (i.e., a flow adjusting shutter) need not be increased as the swinging angle increases, so gases of the same mass can easily open the leaf structure 13 and the value of the swinging angle is completely determined by the gas inflow amount.

On the contrary, if the torsional spring is directly connected to the leaf structure (not shown), then the external force required to swing the leaf structure to a larger angle may be two to four times the external force required to swing the leaf structure to a smaller angle (according to the Hooke's law). In other words, if the conventional leaf structure in a one-way valve form needs to be opened at a large angle, then the larger the angle is, the larger external force will be required, which is disadvantageous to the flow of a large quantity of gases of the same mass.

The technical contents of the elements comprised in the gas flow adjusting device 1 have been described above, and the method in which the gas flow adjusting device 1 is used and operated will be described hereinafter.

Figure 6A:
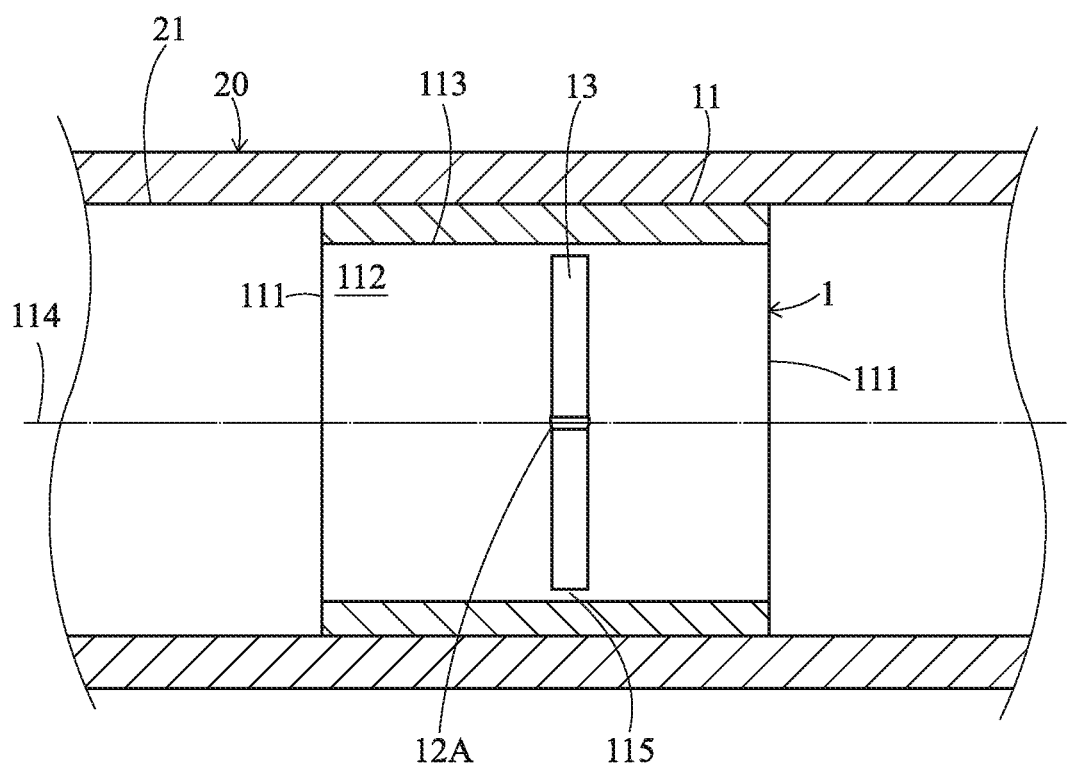
FIGS. 6A to 6C are schematic views of the gas flow adjusting device in use according to the preferred embodiment of the present invention.
Figure 6B:
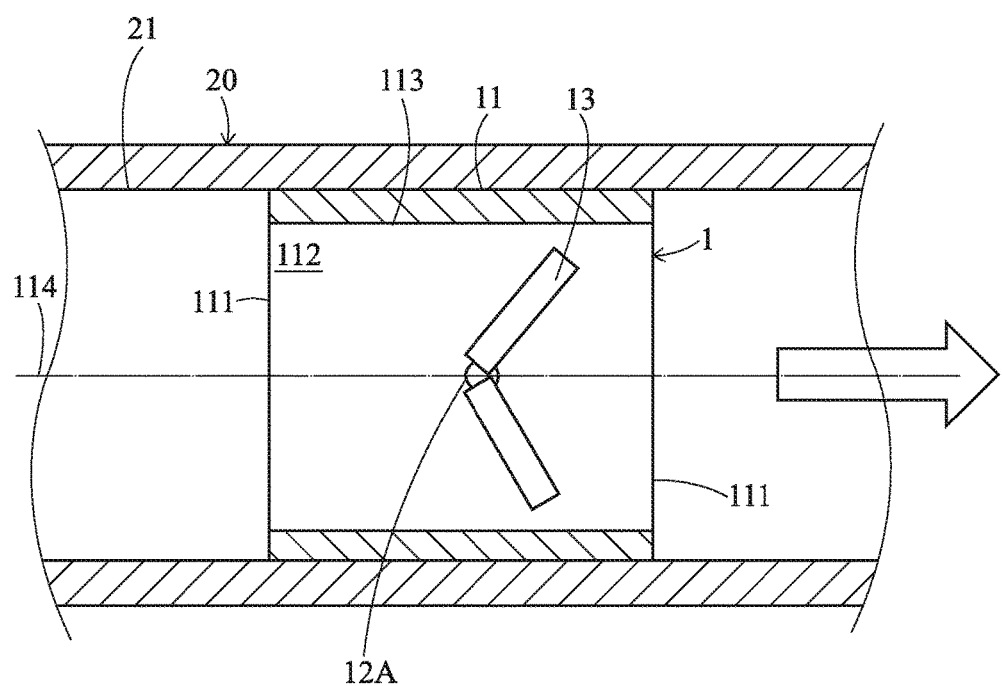
Figure 6C:
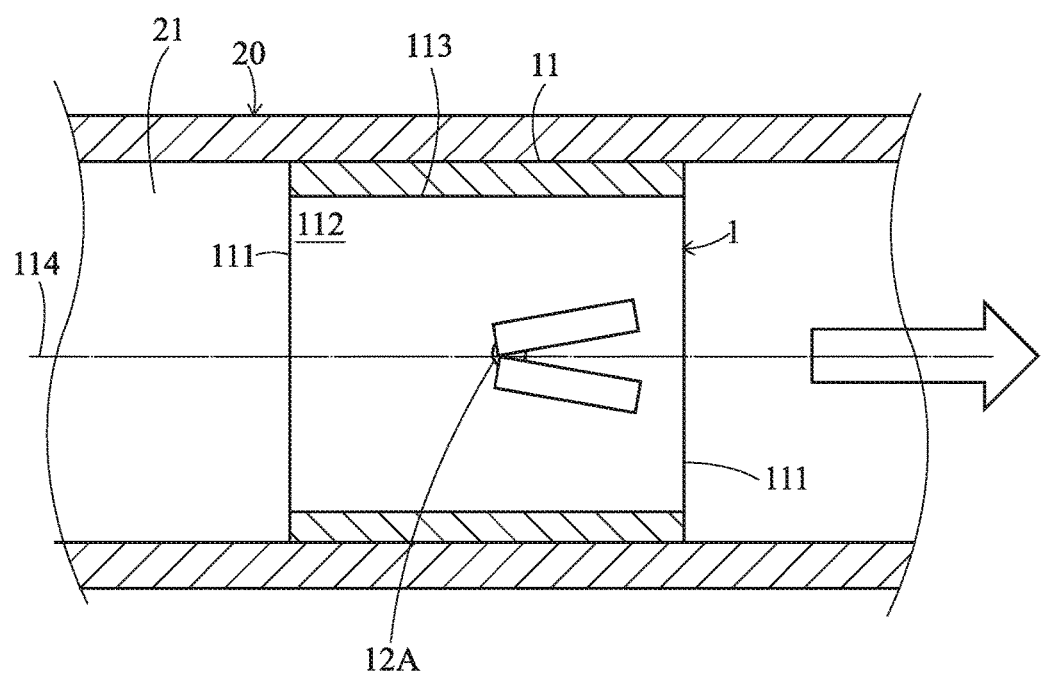

FIGS. 6A to 6C show schematic views of the gas flow adjusting device 1 in use according to the first preferred embodiment of the present invention (with part of the elements omitted from depiction). As shown in FIG. 6A, the gas flow adjusting device 1 may be installed within a gas inlet pipe 20 that is connected with an engine (not shown) and may be located before a gas throttle (not shown).

The tube body 11 of the gas flow adjusting device 1 must make close contact with the inner wall 21 of the gas inlet pipe 20 so that no gas passes between the tube body 11 and the inner wall 21 of the gas inlet pipe 20. If the diameter of the gas inlet pipe 20 is relatively large, then the tube body 11 can be firstly installed in an auxiliary ring (which may be made of an elastic material, not shown) and then installed into the gas inlet pipe 20. In this way, the clearance between the exterior surface of the tube body 11 and the inner wall 21 of the gas inlet pipe 20 can be filled with the auxiliary ring so that the gas can only flow inside the tube body 11. In application, the tube body 11 may be formed integrally with the inner wall 21 of the gas inlet pipe 20, or the gas inlet pipe 20 may be used as the tube body 11 directly (i.e., the first horizontal shaft 12A, the second horizontal shaft 12B, the leaf structures 13, the torsional spring 14 and the linkage assemblies 15 may be disposed on the inner wall 21 of the gas inlet pipe 20 directly).

Figure 7A:
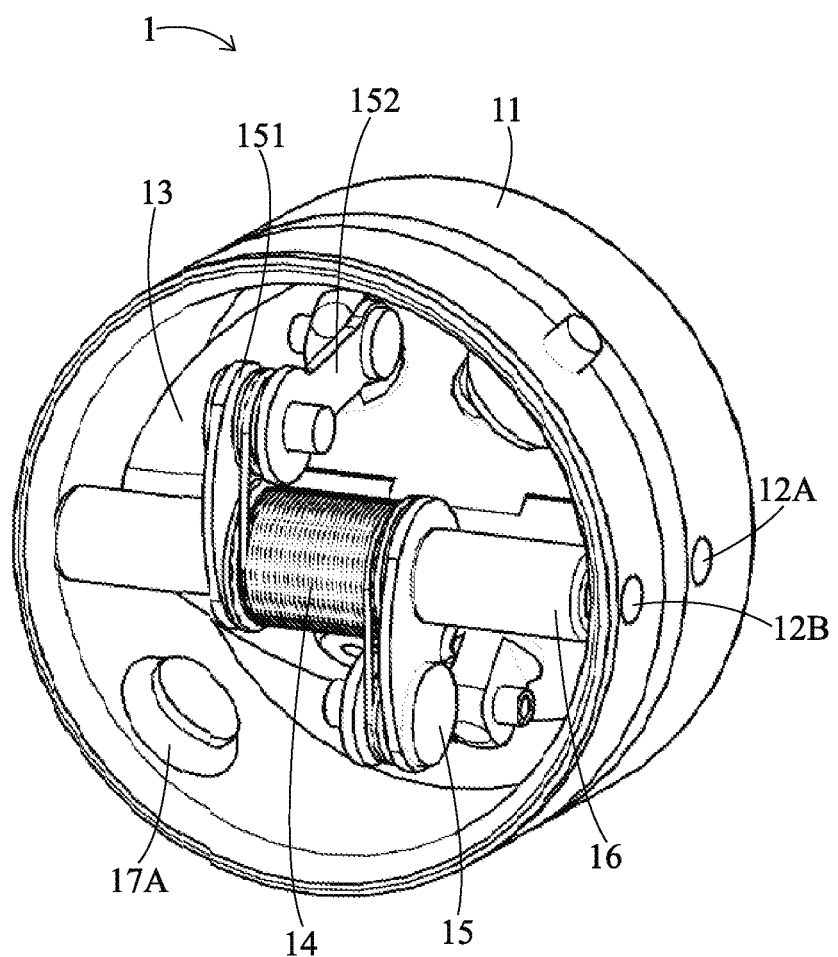
FIGS. 7A to 7B are other perspective assembly views of the gas flow adjusting device according to the preferred embodiment of the present invention.
Figure 7B:
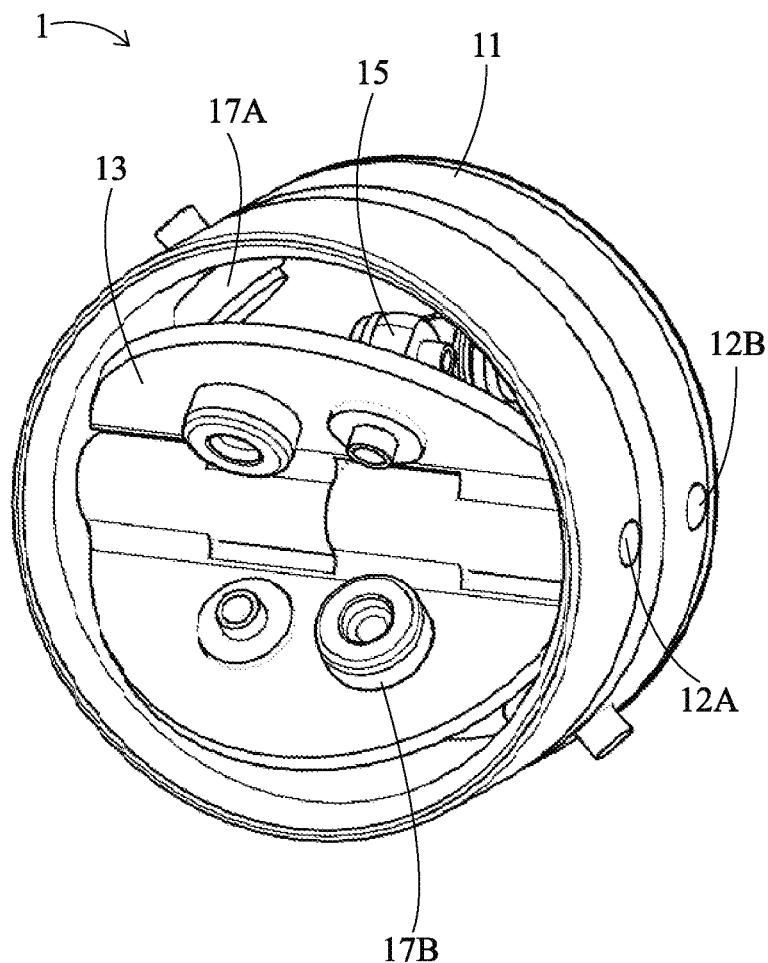

As shown in FIG. 6B, FIG. 7A and FIG. 7B, when the engine starts to suck in air, the generated suction force (as indicated by the arrow in FIG. 6B) can drive the leaf structure 13 to start to swing. Since the leaf structure 13 passively swings to an appropriate position to effectively enlarge the gas inlet passage and space in response to the gas inflow amount, the negative pressure between the leaf structure 13 and the suction source of the cylinder will decrease. This means that the air inflow amount is increased and the fuel efficiency is improved so that the engine can operate more smoothly and become more energy efficient.

Figure 8A:
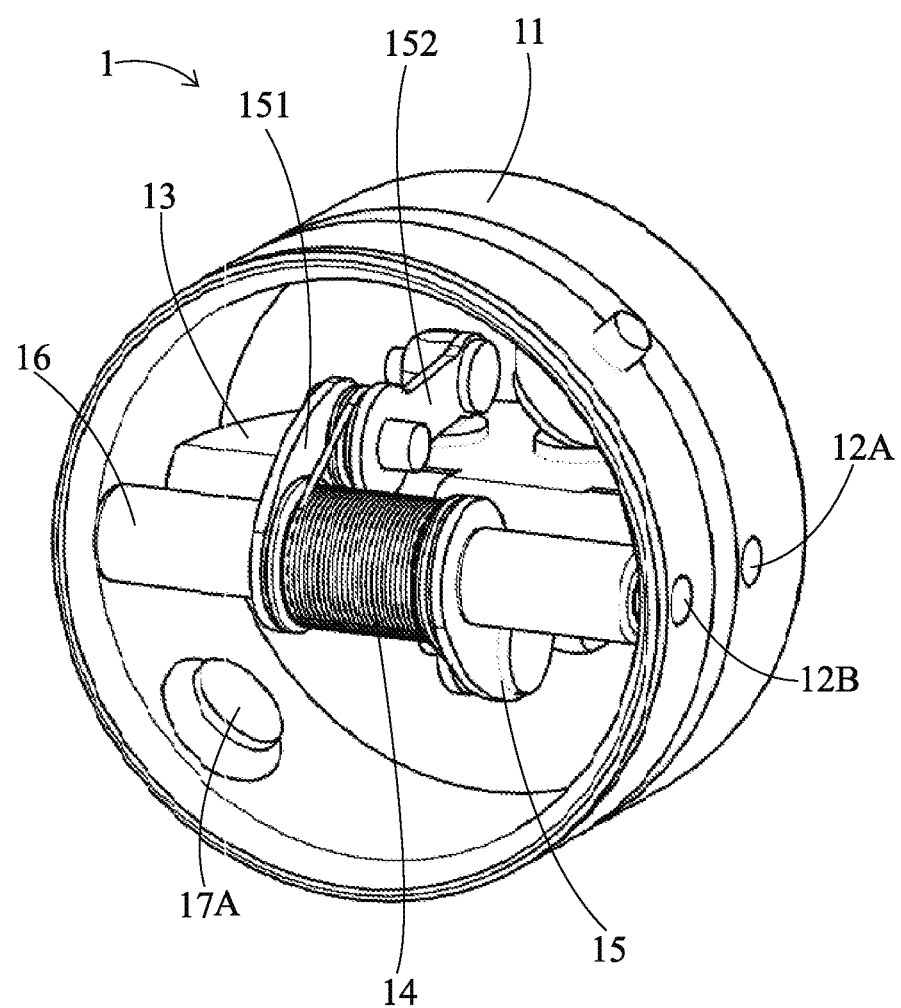
FIGS. 8A to 8B are yet further perspective assembly views of the gas flow adjusting device according to the preferred embodiment of the present invention.
Figure 8B:
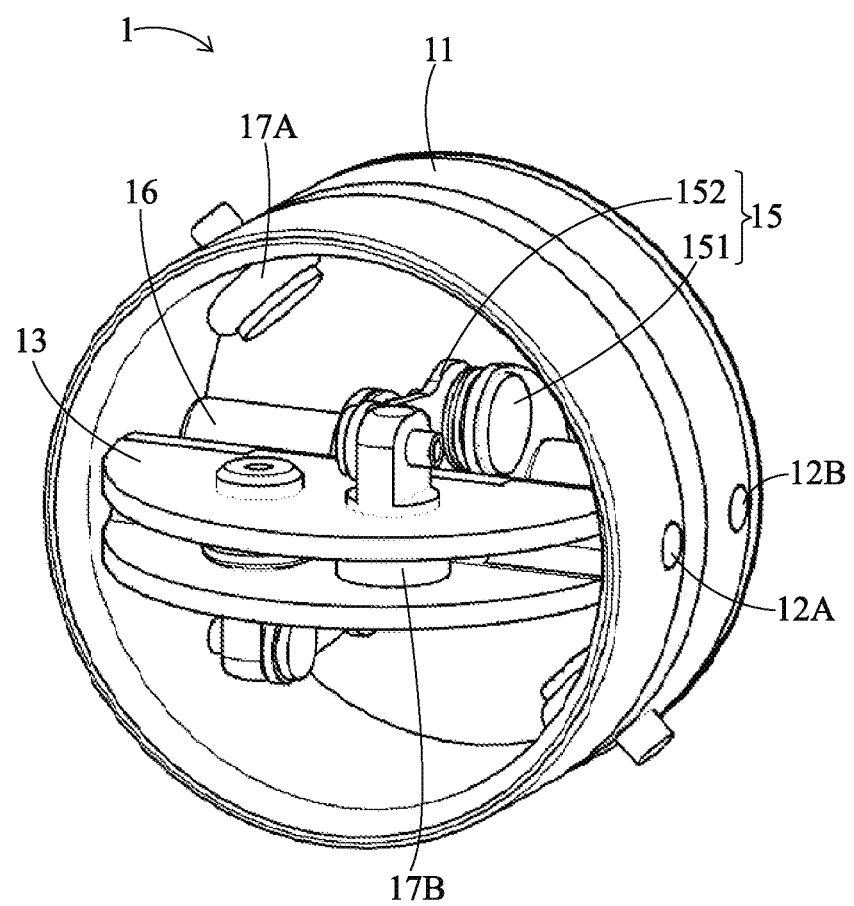

As shown in FIG. 6C, FIG. 8A and FIG. 8B, if the rotational speed of the engine needs to be increased instantly or if the engine needs to instantly output a large amount of power, then a relatively large amount of air inflow is required correspondingly. In this case, the generated suction force can easily drive the leaf structure 13 to swing to the largest appropriate angle so that the leaf structure 13 does not obstruct the gas from entering into the cylinder via the tube body 11. Thus, when the engine is in urgent need of a high rotational speed and a large power output, more gas can be sucked in to support the operation.

However, for conventional leaf structures, the aforesaid suction force cannot drive the conventional leaf structure to swing to a large angle that is required to satisfy the gas inflow amount of the cylinder, so the conventional leaf structure will obstruct the gas from entering into the cylinder, which inevitably influences the operation of the engine. Thus, as compared to the conventional leaf structure, the gas flow adjusting device 1 of this embodiment has better technical effects.

On the other hand, the gas flow adjusting device 1 of this embodiment enables the bi-directional flow of the gas inside the tube body 11. Thus, when the engine or a turbine device needs to exhaust gas for depressurization purpose, the pressure can pass through the gas passage 115 of the tube body 11 in the reverse direction via the gas inlet pipe 20 (as shown in FIG. 6A) and will not be blocked by the leaf structure 13 in the initial status. In this way, the pressure inside the gas inlet pipe 20 will not be blocked, thus avoiding pressure imbalance. Meanwhile, the gas flow adjusting device 1 is protected from damage during the depressurization process.

Moreover, due to the existence of the gas passage 115, the leaf structure 13 can be pivoted on the first horizontal shaft 12A in a slidable manner, i.e., the leaf structure 13 can slide relative to the first horizontal shaft 12A along the axial direction (not shown) of the first horizontal shaft 12A. Thus, the leaf structure 13 not only can swing forwards and backwards but also can slide horizontally (from side to side or up and down) relative to the first horizontal shaft 12A.

The slidable leaf structure 13 can adjust the width of each part of the gas passage 115. For example, if the leaf structure 13 slides to the left of the first horizontal shaft 12A, then the gas passage 115 at the right of the first horizontal shaft 12A widens. In this way, if a foreign matter (e.g., a sand grain, not shown) enters into the tube body 11 together with the gas and is to pass through the gas passage 115, then the foreign matter can push the leaf structure 13 to widen the gas passage 115 so that the foreign matter can easily pass through the gas passage 115. In other words, the foreign matter is less likely to get stuck in the gas passage 115 and stop the leaf structure 13 from swinging. To put it another way, if the foreign matter is wider than a certain part of the gas passage 115, then the foreign matter will initially be pushed against the certain part; however, the pushing force is likely to push the leaf structure 13 to move and thus, widen the certain part, and then the foreign matter can pass therethrough.

Therefore, if the leaf structure 13 is slidable, then the gas flow adjusting device 1 becomes more reliable.

The method in which the gas flow adjusting device 1 is used and operated has been described above, and other possible implementations of the gas flow adjusting device 1 will be described hereinafter.

FIGS. 1 to 5 show that the gas flow adjusting device 1 may further comprise two position limiting sleeves 16, at least two cushion blocks 17A or 17B, and/or a cushion sleeve 18. The technical contents of the aforesaid elements will be described in sequence hereinafter.

The two position limiting sleeves 16 may be sleeved around the second horizontal shaft 12B. The screw portion 141 of the torsional spring 14 is located between the two position limiting sleeves 16. Then, the first links 151 of the two linkage assemblies 15 are sandwiched (or restricted) by the two position limiting sleeves 16 and the torsional spring 14 so that the positions of the first links 151 on the second horizontal shaft 12B are restricted. In this way, the first links 151 will not slide on the second horizontal shaft 12B.

The two cushion blocks 17A (which may also be called positioning cushion blocks) may be disposed in the accommodating space 112 of the tube body 11 and between the two leaf structures 13 and one of the two openings 111 respectively. Specifically, the two cushion blocks 17A are disposed on the interior surface 113 of the tube body 11 and are on the same side of the leaf structure 13 as the linkage assembly 15.

The two cushion blocks 17A can abut on the two leaf structures 13 respectively, so the cushion blocks 17A can limit the swinging range of the leaf structures 13 and can further cushion the impact to the leaf structures 13. In particular, the leaf structure 13 would impact the cushion block 17A when it rapidly swings back to the initial status due to the resilient force of the torsional spring 14. The cushion block 17A can absorb most of the impact force to avoid damage to other elements caused by the impact force.

The other two cushion blocks 17B may be disposed on the two leaf structures 13 respectively. The two leaf structures 13 are located between the two cushion blocks 17B and the two linkage assemblies 15. In other words, the cushion blocks 17B and the linkage assemblies 15 are respectively located at two sides of the leaf structures 13. As shown in FIG. 8B, when the leaf structures 13 swing to almost the 90-degree position, the leaf structures 13 will collide with the cushion blocks 17B to avoid immediate collision between the two leaf structures 13. In addition, the cushion blocks 17B can cushion the impact to the leaf structures 13 to protect the leaf structures 13.

Figure 3:
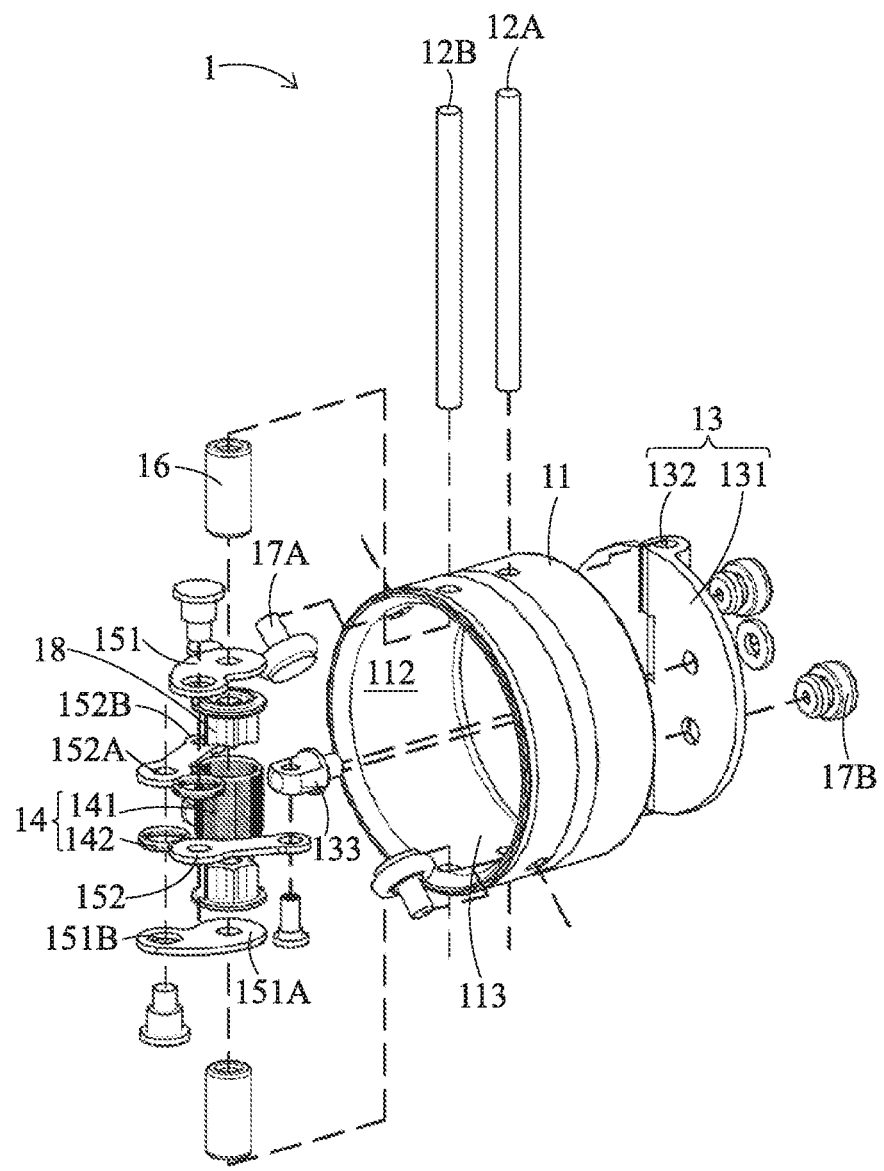
FIG. 3 is a perspective exploded view of the gas flow adjusting device according to the preferred embodiment of the present invention.
Figure 5:
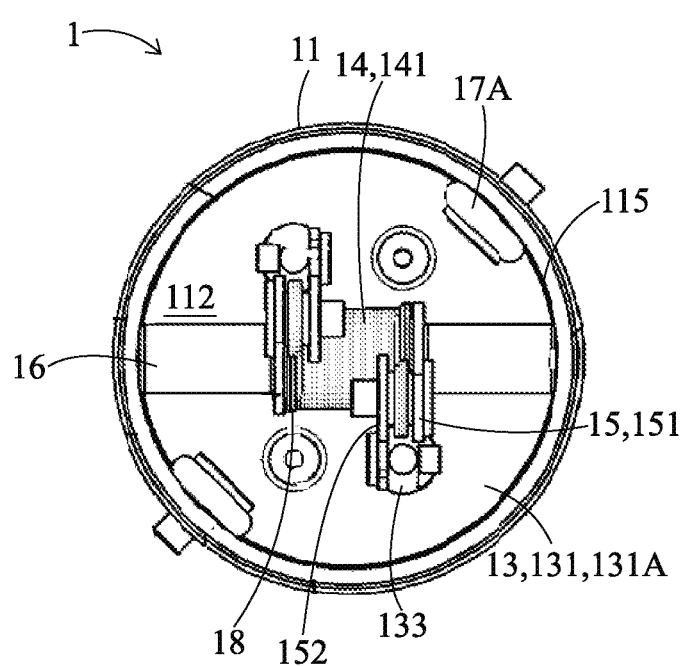
FIG. 5 is a top view of the gas flow adjusting device according to the preferred embodiment of the present invention.

The cushion sleeve 18 (as shown in FIG. 3, 4 or 5) may be sleeved around the second horizontal shaft 12B, while the torsional spring 14 is sleeved around the cushion sleeve 18. In other words, the torsional spring 14 is indirectly sleeved around the second horizontal shaft 12B. The cushion sleeve 18 can absorb the vibration of the torsional spring 14 to protect the torsional spring 14 and further prolong the service life of the torsional spring 14.

The whole or a part of the aforesaid cushion blocks 17A and 17B and the cushion sleeve 18 may be made of elastic or soft materials to achieve the cushion effect. In this way, the forces generated by the swing of the leaf structure 13 is unlikely to cause damage to itself or other elements during the operation of the gas flow adjusting device 1. Thereby, the reliability of the gas flow adjusting device 1 is improved, and the service life of the gas flow adjusting device 1 is prolonged.

On the other hand, the linkage assemblies are not limited to the four-link mechanism and may be implemented in other ways (as shown in FIG. 12, which will be detailed later) in other embodiments (not shown), and thus, other linkage mechanisms capable of transferring forces are also possible.

Figure 9A:
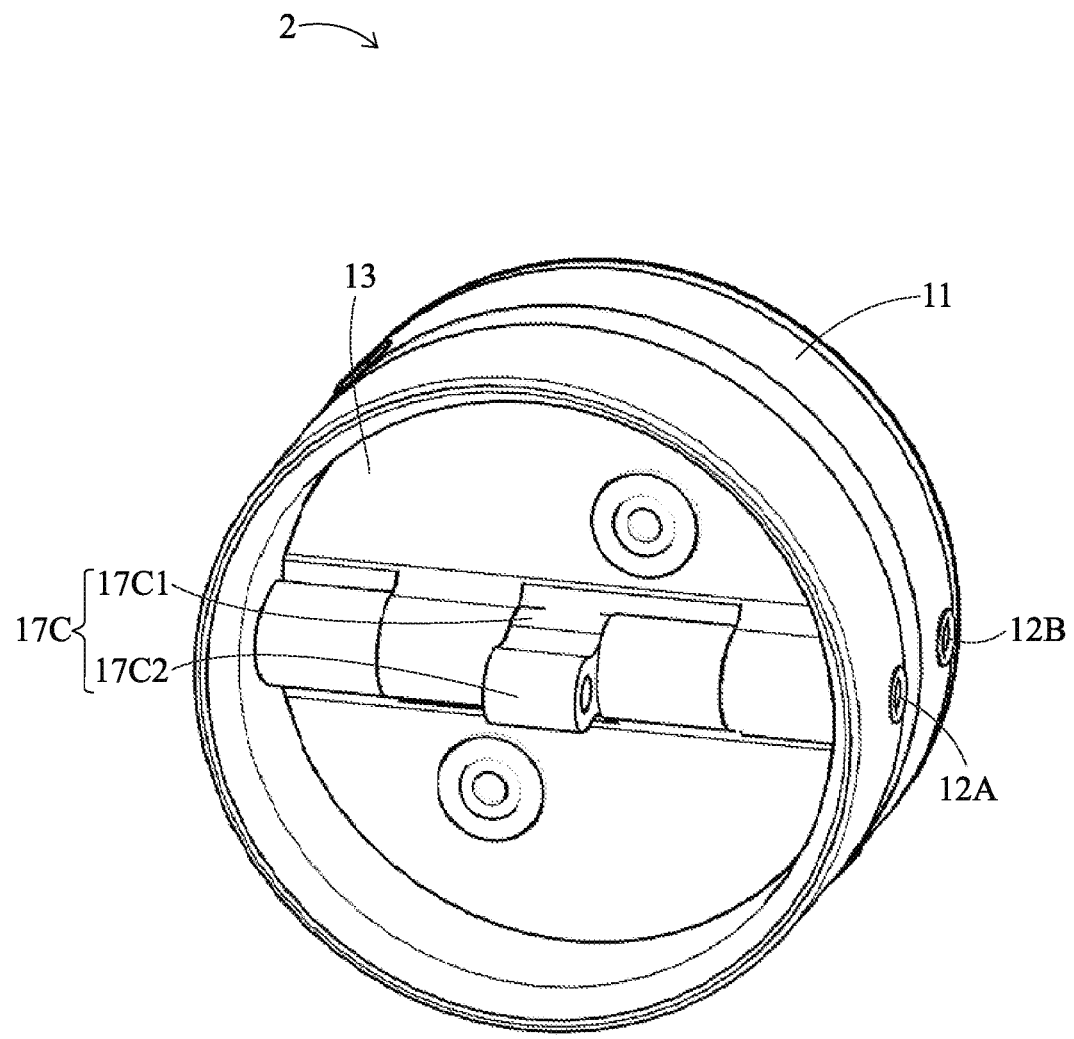
FIGS. 9A to 9B are respectively a perspective assembly view and a perspective exploded view of a gas flow adjusting device according to another preferred embodiment of the present invention.
Figure 9B:
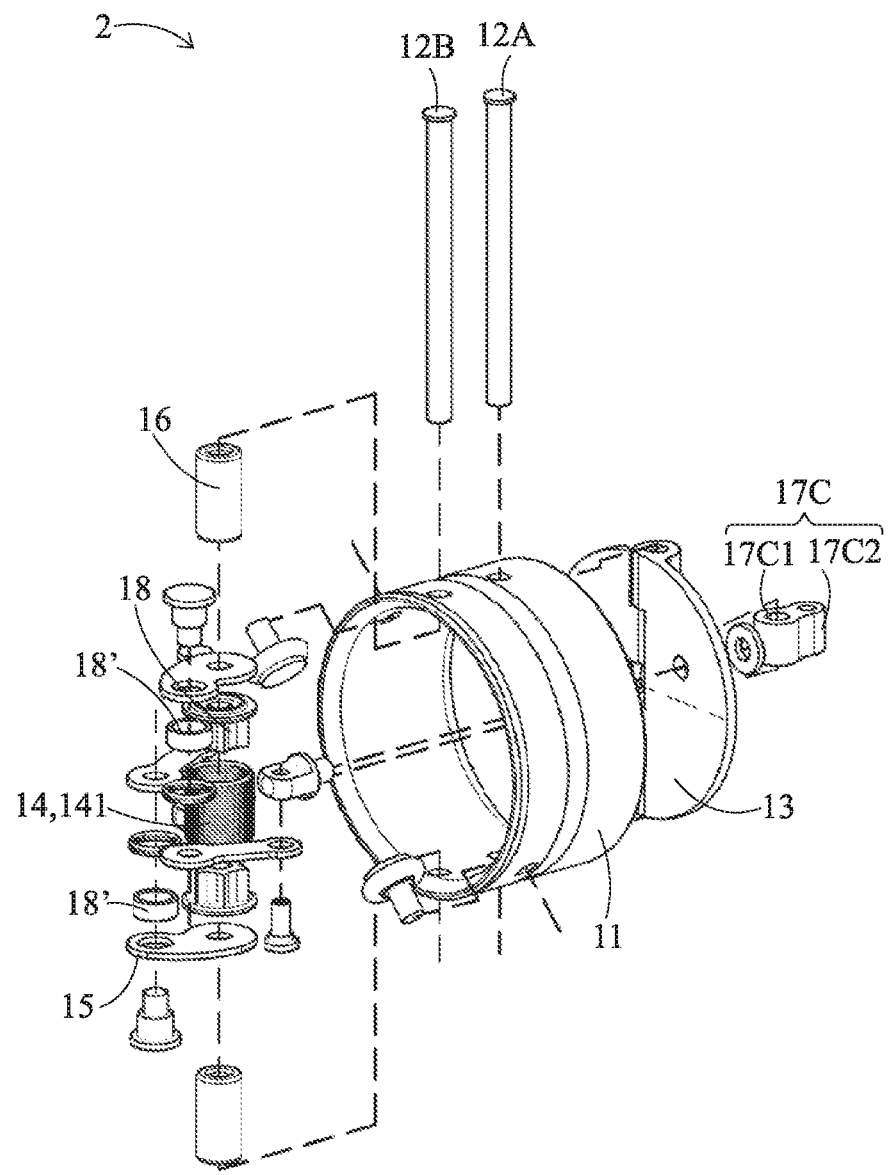
Figure 10:
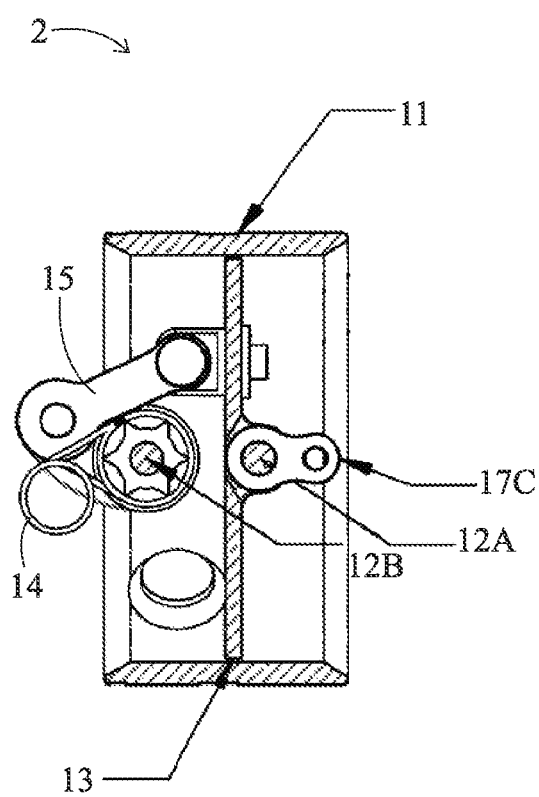
FIG. 10 is a cross-sectional plan view of the gas flow adjusting device according to the another preferred embodiment of the present invention.

FIGS. 9A, 9B and 10 show a perspective assembly view, a perspective exploded view and a plan cross-sectional view of a gas flow adjusting device according to another preferred embodiment of the present invention. In the another embodiment, a gas flow adjusting device 2 is proposed which is similar to the aforesaid gas flow adjusting device 1, and reference may be made to one another for the technical contents of the two devices or the technical contents of the two devices may be applied to one another.

The gas flow adjusting device 2 differs from the gas flow adjusting device 1 in that it further comprises two cushion sleeves 18' (as shown in FIG. 9B) in addition to the two cushion sleeves 18, and the two cushion sleeves 18' are disposed on the two cantilever portions 142 respectively (i.e., disposed at the joint where the first link 151 and the second link 152 are connected together). Both the cushion sleeves 18 and 18' can absorb the vibration of the torsional spring 14 to protect the torsional spring 14 and further prolong the service life of the torsional spring 14. Moreover, the first horizontal shaft 12A and the second horizontal shaft 12B comprised in the gas flow adjusting device 2 may be rivets or structures similar to rivets to be fixed on the tube body 11 more easily or securely.

The gas flow adjusting device 2 further comprises a cushion block 17C which has a first end 17C1 and a second end 17C2 opposite to the first end 17C1. The first end 17C1 is disposed on the first horizontal shaft 12A, while the second end 17C2 extends along a direction departing from the second horizontal shaft 12B (in other words, the second end 17C2 and the second horizontal shaft 12B are respectively located at the front and the back sides of the leaf structure 13). Additionally, the first end 17C1 may have a through hole so that the first horizontal shaft 12A can pass therethrough.

Figure 11:
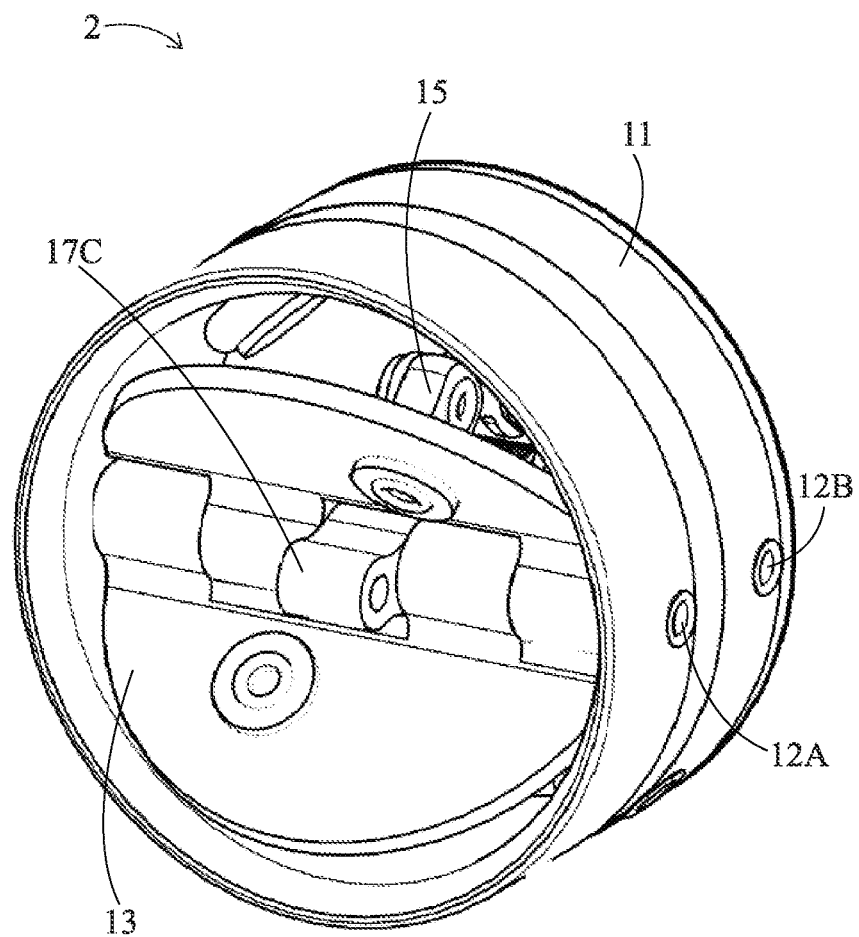
FIG. 11 is another perspective assembly view of the gas flow adjusting device according to the another preferred embodiment of the present invention.

With reference to FIG. 11, when the two leaf structures 13 swing to almost a 90-degree position, the cushion block 17C will collide with and be sandwiched by the leaf structures 13 to avoid immediate collision between the two leaf structures 13. Besides, the cushion block 17C can cushion the impact force to the leaf structures 13 to protect the leaf structures 13.

Figure 12A:
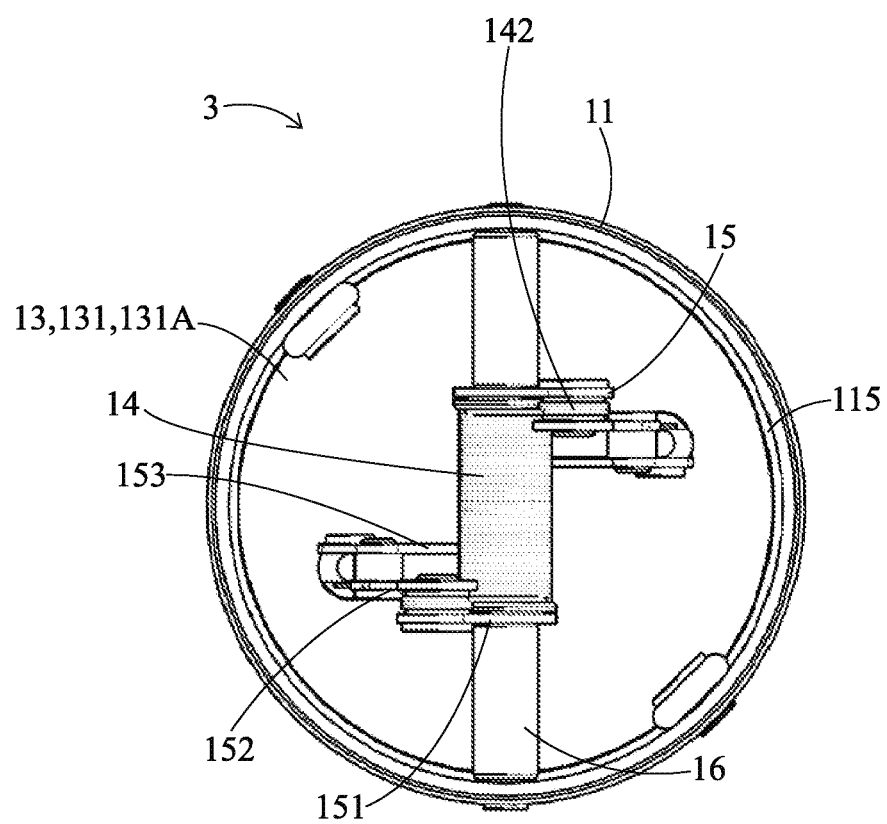
FIGS. 12A and 12B are respectively a front view and a cross-sectional plan view of a gas flow adjusting device according to a further preferred embodiment of the present invention.
Figure 12B:
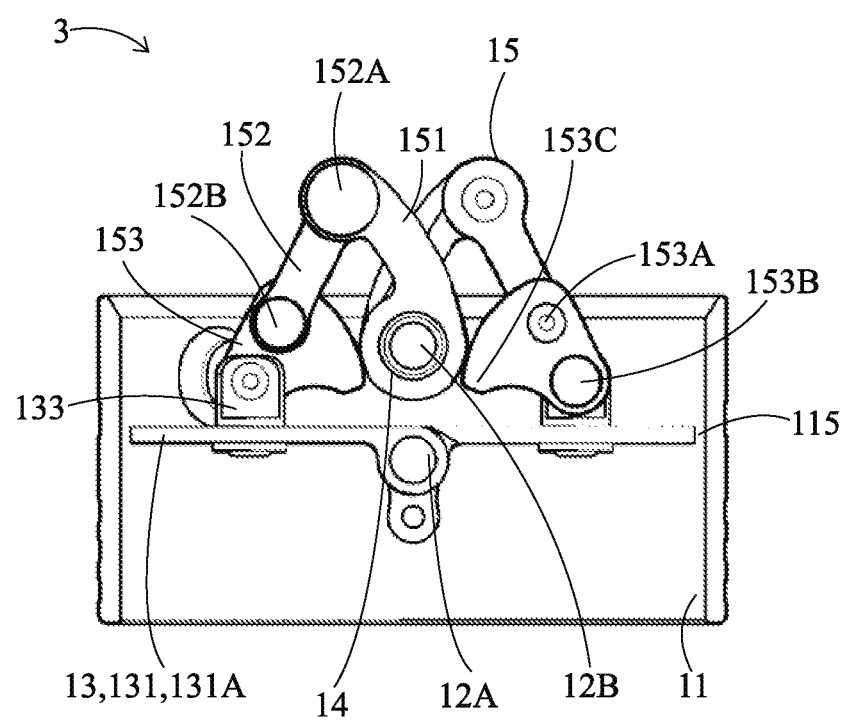
Figure 13:
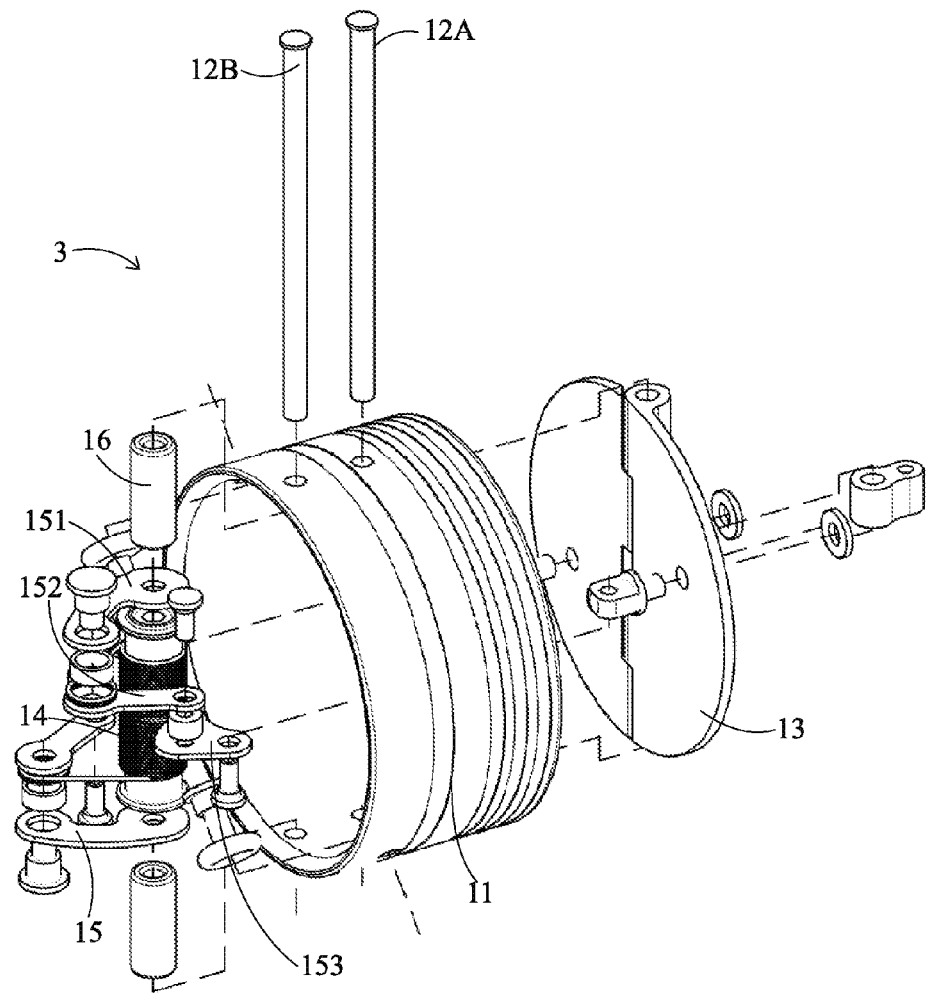
FIG. 13 is a perspective exploded view of a gas flow adjusting device according to the further preferred embodiment of the present invention.

With reference to FIGS. 12A, 12B and 13, a front view, a cross-sectional plan view and a perspective exploded view of a gas flow adjusting device according to a further preferred embodiment of the present invention are shown therein respectively. In the preferred embodiment, another gas flow adjusting device 3 is proposed. The gas flow adjusting device 3 is similar to the aforesaid gas flow adjusting devices 1 and 2, so reference may be made to one another for the technical contents of these devices or the technical contents of these devices may be applied to one another. However, the gas flow adjusting device 3 differs in that each linkage assembly 15 comprised in the gas flow adjusting device 3 further comprises a third link 153 in addition to the first link 151 and the second link 152.

Specifically, as shown in FIG. 12B, the third link 153 has a first end 153A and a second end 153B. The first end 153A is rotatably connected to the second end 152B of the second link 152, and the second end 153B is rotatably connected to the leaf structure 13 (e.g., to the rotary joint 133 of the leaf structure 13). Then, when the leaf structure 13 swings under the action of an external force, the third link 153 will swing along with the leaf structure 13 and the second link 152 and the first link 152 operate correspondingly. The torsional spring 14 begins to store a resilient force so that the leaf structure 13 returns to the original position under the action of the linkage assembly 15 when the external force is reduced or released.

The linkage assembly 15 in this form can also achieve the technical effect that "the external force necessary for the leaf structure 13 to swing to a small angle differs insignificantly from the external force necessary for the leaf structure 13 to swing to a large angle". In other words, the resilient force to overcome when the leaf structure 13 swings to a small angle differs insignificantly from the resilient force to overcome when the leaf structure 13 swings to a large angle.

On the other hand, the third link 153 may preferably have a protrusion 153C, which extends towards the leaf structure 13 from the first end 153A and/or the second end 153B. That is, the protrusion 153C protrudes from the first end 153A and/or the second end 153B and extends towards the leaf structure 13; or in other words, the distal end of the protrusion 153C is located between the leaf structure 13 and "the first end 153A and/or the second end 153B". Therefore, the third link 153 may be similar to a triangle structure.

Figure 14A:
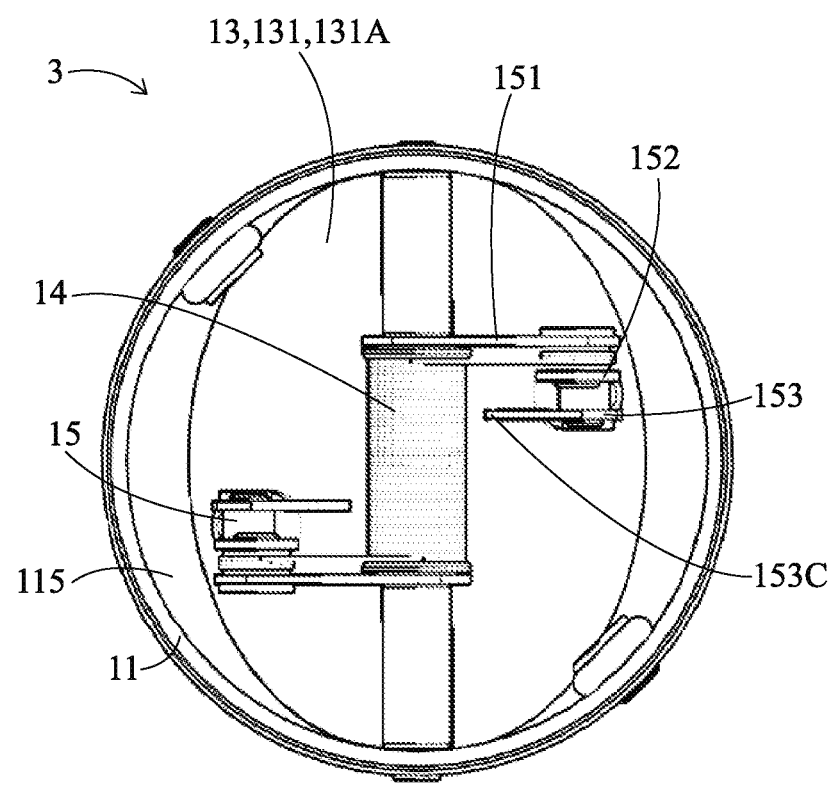
FIGS. 14A and 14B are respectively a front view and a cross-sectional plan view of a gas flow adjusting device according to yet another preferred embodiment of the present invention.
Figure 14B:
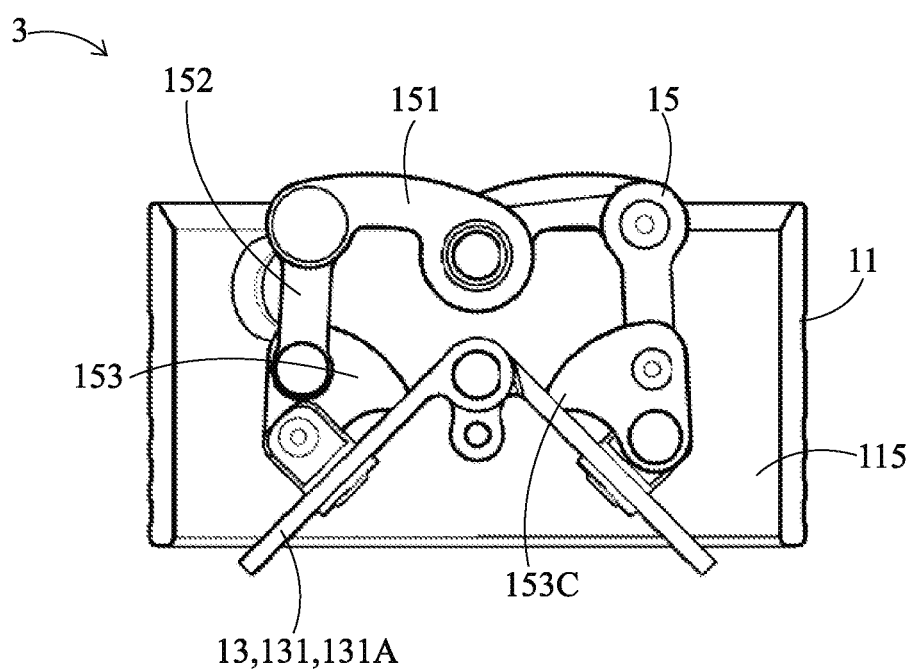
Figure 15A:
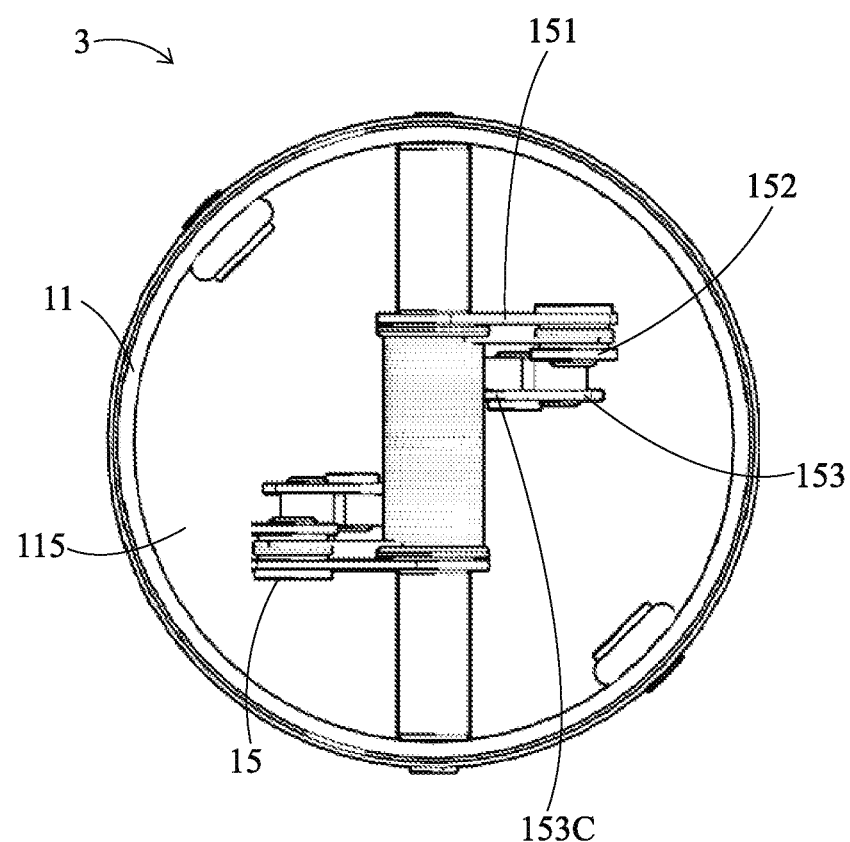
FIGS. 15A and 15B are respectively a front view and a cross-sectional plan view of a gas flow adjusting device according to yet a further preferred embodiment of the present invention.
Figure 15B:
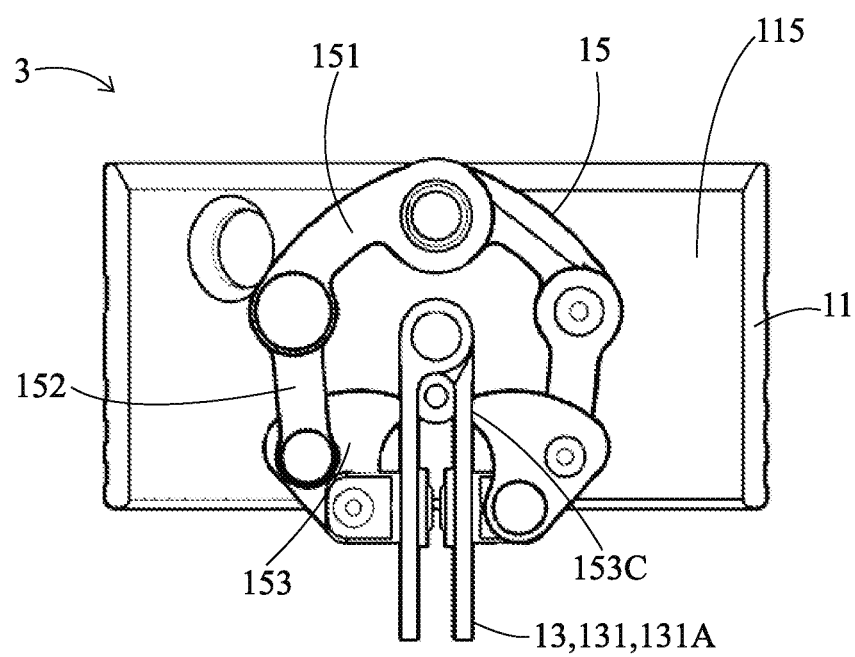

The protrusion 153C is disposed in such a way that it makes contact with the leaf structure 13 when the leaf structure 13 rotates to a predetermined angle. That is, as shown in FIG. 14A and FIG. 14B, the distal end of the protrusion 153C makes contact with the side surface 131A of the leaf portion 131 of the leaf structure 13 when the leaf structure 13 begins to swing to the predetermined angle (e.g., 45°) under the action of an external force; and then when the leaf structure 13 continues to swing to 90° (as shown in FIG. 15A and FIG. 15B), the protrusion 153C still makes contact with the leaf structure 13. However, the protrusion 153C does not make contact with the leaf structure 13 before the leaf structure swings to 45° (as shown in FIG. 12A and FIG. 12B).

With reference back to FIGS. 14A and 14B, contact of the protrusion 153C with the leaf structure 13 can change the applying conditions of the force applied by the linkage assembly 15 to the leaf structure 13 so that the leaf structure 13 can more easily be pushed to swing by the external force. More specifically, because the protrusion 153C makes contact with the leaf structure 13 between the first horizontal shaft 12A and the rotary joint 133, the third link 153 applies a force to the leaf structure 13 not only at the rotary joint 133 but also between the rotary joint 133 and the first horizontal shaft 12A (i.e., the resilient force of the torsional spring 14 is applied to the leaf structure 13 in a distributed way to resist the external force). Because one of the force applying points is close to the first horizontal shaft 12A, the torque generated by the resilient force is reduced. Thereby, the external force necessary for overcoming the torque of the resilient force is also reduced so that the leaf structure 13 can be pushed to swing by a smaller force.

Therefore, after the leaf swing 13 has swung to the predetermined angle, the protrusion 153C can help to reduce the external force necessary for pushing the leaf structure 13 to swing to quickly enlarge the gas passage 115. Here, the phrase "the external force is reduced" is shall be understood with respect to the case where there is no protrusion 153C (e.g., in the case of the gas flow adjusting device 1) but possibly not with respect to angles smaller than the predetermined angle. It shall further be appreciated that the shape and/or dimensions of the protrusion 153C may be adjusted to decide the predetermined angle where the protrusion begins to make contact with the leaf structure 13; that is, the protrusion 153C may be disposed to make contact with the leaf structure 13 at various angles instead of being limited to the angle of 45°.

According to the above descriptions, the gas flow adjusting device according to the present invention can increase the gas inflow amount and will not overly hinder the flow of the gas; or the gas flow adjusting device enables the gas to be exhausted to pass therethrough in the reverse direction; or the components of the gas flow adjusting device is less likely to be damaged.

Furthermore, the force exerted on the leaf structure (i.e., the flow adjusting shutter) by the torsional spring according to the Hooke's law is transferred through the pivoting movement of the linkage assemblies and the change of the axial forces. Thus, the leaf structure is under almost the same resilient force when it swings to various angles (or possibly, has a smaller resilient force when the leaf structure swings to a large angle), and the leaf structure can be easily and passively adjusted at any time to obtain the effective and rapid gas inlet passage in response to the air amount required by various rotational speed ranges. Thus, the present invention can increase the air inflow amount, improve the fuel efficiency, achieve energy conservation and reduce carbon emissions.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A gas flow adjusting device, comprising:
   a tube body, including two openings and an accommodating space between the two openings;
   a first horizontal shaft and a second horizontal shaft, which are disposed in the accommodating space of the tube body and spaced apart from each other along an axial direction of the tube body;

two leaf structures, pivoted on the first horizontal shaft and having a swinging direction identical to the axial direction;
a torsional spring, sleeved around the second horizontal shaft and providing a resilient force along the axial direction of the tube body; and
two linkage assemblies, connected to the two leaf structures respectively, wherein each of the two linkage assemblies is connected to the second horizontal shaft and the torsional spring,
wherein each of the two linkage assemblies includes a first link and a second link, a first end of the first link is pivoted on the second horizontal shaft and a second end of the first link is rotatably connected to a first end of the second link, and a second end of the second link is rotatably connected to one of the two leaf structures, and the torsional spring includes two cantilever portions which are connected to a joint where the first and second links of the two linkage assemblies are connected together.

2. The gas flow adjusting device of claim 1, wherein each of the two leaf structures is spaced apart from an interior surface of the tube body to form a gas passage, such that parts of the accommodating space at both sides of the two leaf structures keep in communication by the gas passage.

3. The gas flow adjusting device of claim 2, wherein the two leaf structures are pivoted on the first horizontal shaft in a slidable manner.

4. The gas flow adjusting device of claim 1, wherein each of the two leaf structures includes a leaf portion and a rotary joint, and the rotary joint is disposed on a side surface of the leaf portion and is rotatably connected to the second end of the second link.

5. The gas flow adjusting device of claim 1, further comprising two position limiting sleeves which are sleeved around the second horizontal shaft and the torsional spring is located between the two position limiting sleeves; wherein the first links of the two linkage assemblies are sandwiched by the two position limiting sleeves and the torsional spring.

6. The gas flow adjusting device of claim 1, further comprising two cushion sleeves disposed on the two cantilever portions respectively.

7. The gas flow adjusting device of claim 1, further comprising two cushion blocks which are disposed in the accommodating space of the tube body and between the two leaf structures and one of the two openings respectively; wherein the two cushion blocks abut on the two leaf structures respectively.

8. The gas flow adjusting device of claim 1, further comprising two cushion blocks which are disposed on the two leaf structures respectively; wherein the two leaf structures are located between the two cushion blocks and the two linkage assemblies.

9. The gas flow adjusting device of claim 1, further comprising at least one or two cushion sleeves which are sleeved around the second horizontal shaft; wherein the torsional spring is sleeved around the at least one or two cushion sleeves.

10. The gas flow adjusting device of claim 1, further comprising a cushion block which includes a first end and a second end opposite to the first end, wherein the first end is disposed on the first horizontal shaft, and the second end extends along a direction departing from the second horizontal shaft.

11. A gas flow adjusting device, comprising:
a tube body, including two openings and an accommodating space between the two openings;
a first horizontal shaft and a second horizontal shaft, which are disposed in the accommodating space of the tube body and spaced apart from each other along an axial direction of the tube body;
two leaf structures, pivoted on the first horizontal shaft and having a swinging direction identical to the axial direction;
a torsional spring, sleeved around the second horizontal shaft and providing a resilient force along the axial direction of the tube body; and
two linkage assemblies, connected to the two leaf structures respectively, wherein each of the two linkage assemblies is connected to the second horizontal shaft and the torsional spring,
wherein each of the two linkage assemblies includes a first link, a second link and a third link, a first end of the first link is pivoted on the second horizontal shaft and a second end of the first link is rotatably connected to a first end of the second link, a second end of the second link is rotatably connected a first end of the third link, and a second end of the third link is rotatably connected to one of the two leaf structures, and the torsional spring includes two cantilever portions which are connected to a joint where the first and second links of the two linkage assemblies are connected together.

12. The gas flow adjusting device of claim 11, wherein the third link further includes a protrusion which extends towards the leaf structure from the first end and/or the second end of the third link; the protrusion is configured to make contact with the leaf structure when the leaf structure rotates to a predetermined angle.

13. The gas flow adjusting device of claim 11, wherein each of the two leaf structures includes a leaf portion and a rotary joint, and the rotary joint is disposed on a side surface of the leaf portion and is rotatably connected to the second end of the third link.

\* \* \* \* \*